(12) United States Patent
Burback

(10) Patent No.: US 7,597,064 B2
(45) Date of Patent: Oct. 6, 2009

(54) PROCESS TO ENABLE LIVE-BEARING FRESH WATER FISH TO LIVE AND BREED IN A SALT WATER ENVIRONMENT

(76) Inventor: Ronald LeRoy Burback, 1944 Paseo Del Cajon, Pleasanton, CA (US) 94566

( * ) Notice: Subject to any disclaimer, the term of this patent is extended or adjusted under 35 U.S.C. 154(b) by 289 days.

(21) Appl. No.: 11/743,281

(22) Filed: May 2, 2007

(65) Prior Publication Data

US 2008/0271680 A1 Nov. 6, 2008

(51) Int. Cl.
*A01K 29/00* (2006.01)
(52) U.S. Cl. ....................................... 119/231
(58) Field of Classification Search ............... 119/200, 119/205, 215, 234, 236, 43, 231
See application file for complete search history.

(56) References Cited

U.S. PATENT DOCUMENTS

| | | | |
|---|---|---|---|
| 3,777,709 A | 12/1973 | Anderson | |
| 4,441,453 A | 4/1984 | McMickle | |
| 5,351,651 A | 10/1994 | Ushio | |
| 5,433,554 A * | 7/1995 | Minakami et al. | 405/81 |
| 6,016,770 A | 1/2000 | Fisher | |
| 6,463,883 B1 | 10/2002 | Harris | |
| 6,854,422 B2 | 2/2005 | Harris | |
| 2003/0230247 A1* | 12/2003 | Harris et al. | 119/230 |
| 2006/0086323 A1* | 4/2006 | Park | 119/215 |

OTHER PUBLICATIONS

Shikano and Fujio, Strain Differences in Seawater Adaptability in Newborn Guppy *Pecilia reticulata*, Dec. 1, 1997 vol. 64(6), pp. 987-988.*

* cited by examiner

*Primary Examiner*—Thomas Price

(57) ABSTRACT

The invention provides for a process that enables live-bearing fresh water fish to live and breed in a salt water environment such as an aquarium. The process starts with a live birth of fry in an aquarium where the salinity of the water matches the salinity of amniotic fluids. Once the fry stabilize, the salinity can be gradually increased to match the salinity of a standard salt water aquarium. The fry and their offspring mature, live, and breed in salt water with no future intervention.

5 Claims, 6 Drawing Sheets

PROCESS TO ENABLE LIVE-BEARING FRESH WATER FISH TO LIVE AND BREED IN A SALT WATER ENVIRONMENT

BACKGROUND OF THE INVENTION

Salt maintenance in the internal fluids of a fish is accomplished by special biological salt pumps located in the gills. The biological salt pumps are configured for salt elimination for salt water fish. The biological salt pumps are configured for salt retention for fresh water fish.

The skin of fish is water permutable. A fresh water fish absorbs water through the skin and eliminates excess water through the kidneys. A salt water fish loses water through the skin and is forced to drink salt water.

When a salt water fish is placed in fresh water the salt water fish will have difficulties maintaining adequate internal salt balance. When a fresh water fish is placed in salt water the fresh water fish will have difficulties eliminating excess salt. Both fish when placed in non-native salt level environments will soon die without appropriate intervention.

A special configuration exists for the biological salt pumps in the gills of live-bearing prenatal fry. The biological salt pumps are configured for both salt retention and elimination. This is due to the salinity of the amniotic fluid surrounding the prenatal fry.

In the normal case, if the fry are birthed in fresh water, the elimination biological salt pumps are sequentially disabled. In the exception case, if the fry are birthed in water matching the salinity of the amniotic fluid, the elimination biological salt pumps are not disabled but continue to operate. With the aid of natural occurring hormones, salinity of the water can now safely be increased to the salinity of sea water.

Once the fry reach adulthood they breed true. The adult fish and their descendants can now breed and flourish in salt water without further interventions.

BRIEF SUMMARY OF THE INVENTION

The invention provides for a process that enables live-bearing fresh water fish to live and breed in a salt water environment such as an aquarium. The process starts with a live birth of fry in an aquarium where the salinity of the water matches the salinity of amniotic fluids. Once the fry stabilize, the salinity can be gradually increased to match the salinity of a standard salt water aquarium. The fry and their offspring mature, live, and breed in salt water with no future intervention.

DESCRIPTION OF THE DRAWINGS

Figure 1:
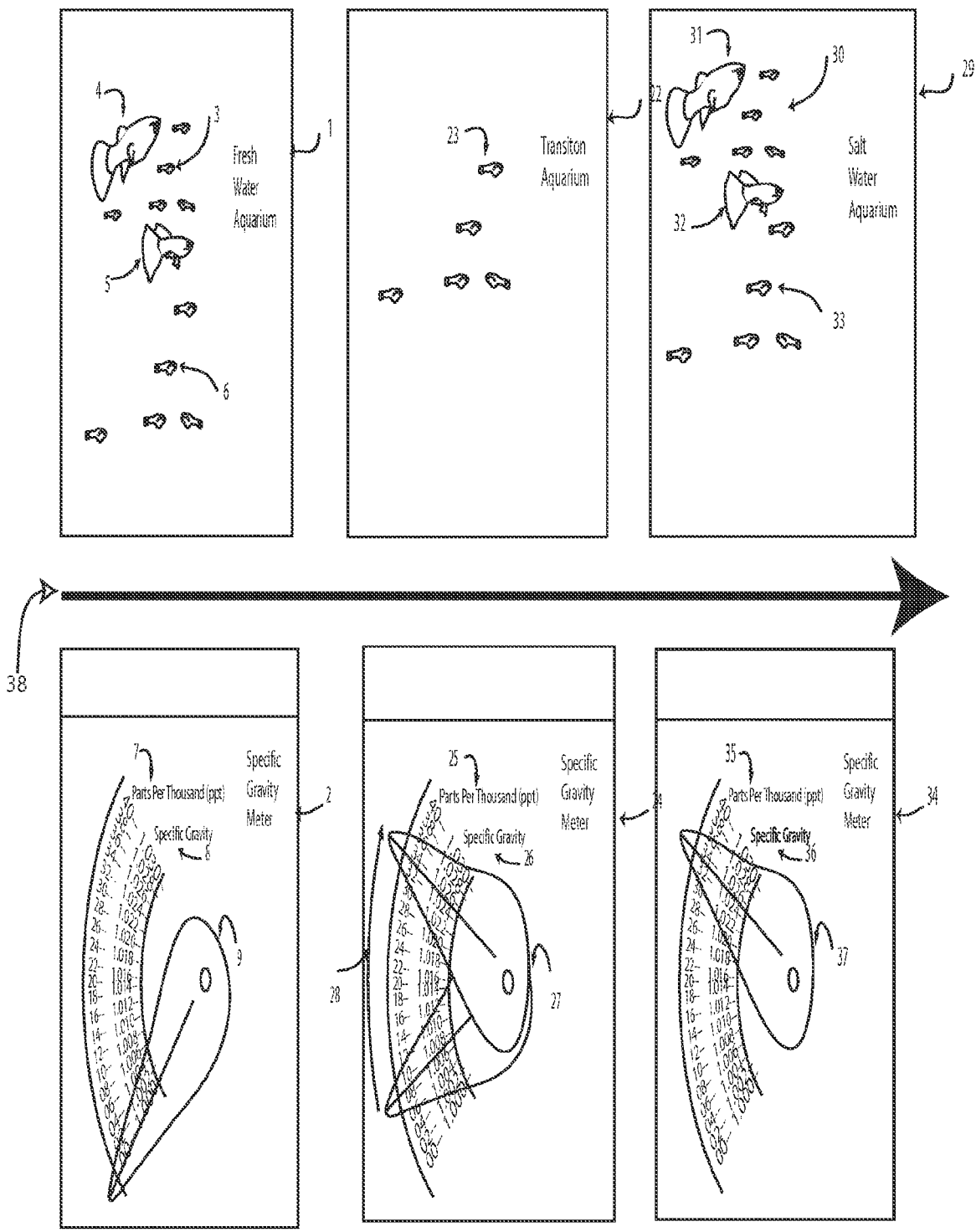
FIG. 1 depicts the overview of the process to enable live-bearing fresh water fish to breed in a salt water environment.

In the drawings which depict a detailed embodiment of the invention:

FIG. 1 depicts the initial fresh water aquarium populated with a stable population of live-bearing fresh water fish (label 1), the transition aquarium populated with fry that have been birthed in the transition aquarium when the salinity matched that of amniotic fluid (label 22) and the finial salt water aquarium populated with a stable population of live-bearing salt water fish which are descendants of the for mentioned live-bearing fresh water fish (label 29). The arrow (label 38) indicates the direction of the transition process to enable freshwater fish to live in salt water. Other labels are defined subsequently.

Figure 2:
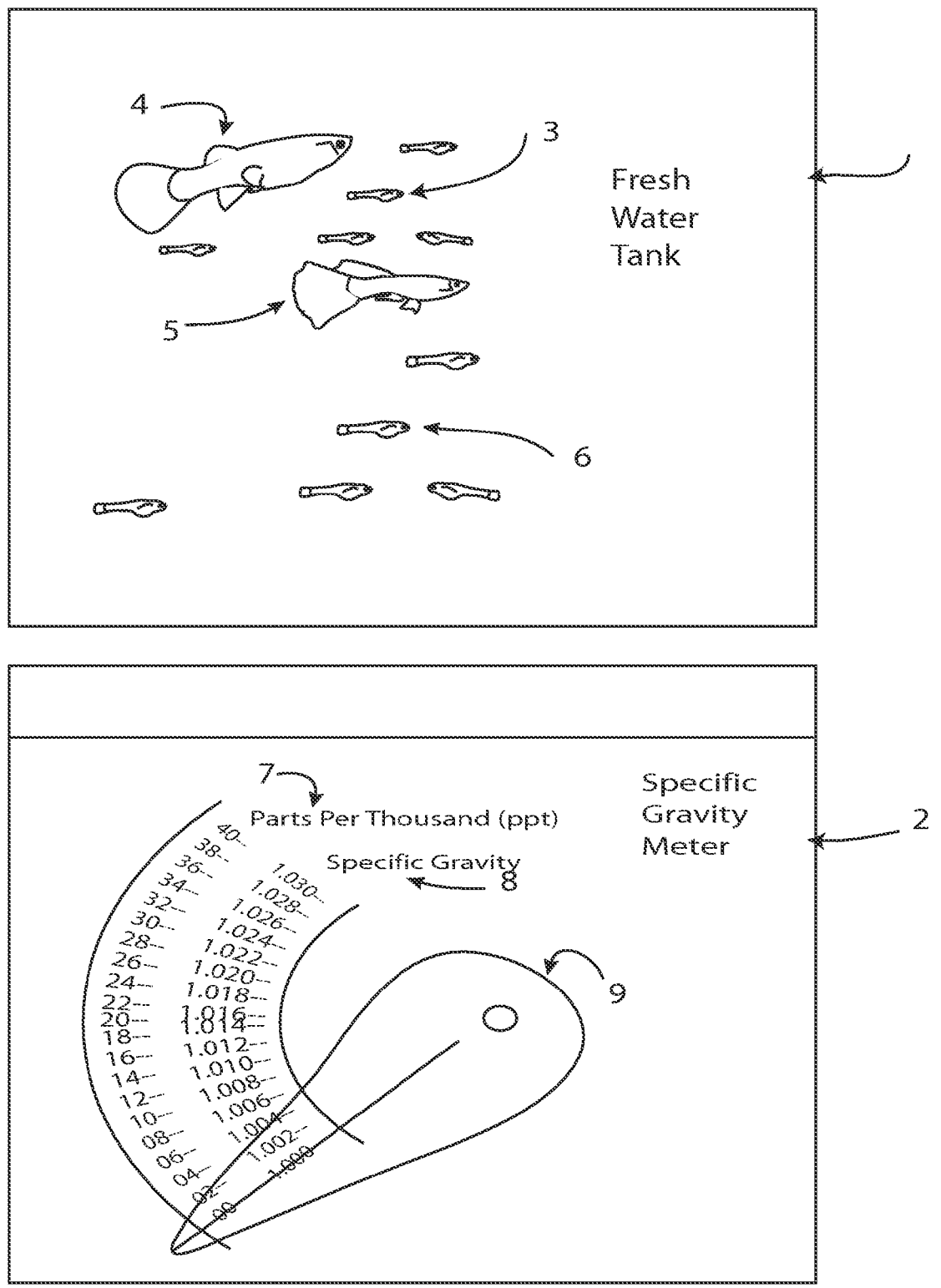
FIG. 2 depicts the initial phase of the process staffing with a stable population of live-bearing fresh water fish in a fresh water aquarium.

FIG. 2 depicts the initial fresh water aquarium (label 1) and the initial specific gravity meter (label 2).

The fresh water aquarium is populated with adult females (label 4), adult males (label 5), fry (label 3), and adolescents (label 6).

The specific gravity meter consists of two related scales to measure the quantity of salt present in the water in the aquarium. One scale (label 8) measures the specific gravity from 1.000 to 1.030. A specific gravity reading of 1.000 represents fresh water with no salt. Another scale (label 7) measures the salinity from 0 to 40 in parts per thousand (ppt). A salinity of 0 represents fresh water with no salt. An indicator (label 9) measures the salinity of the water in either specific gravity or parts per thousands. The indicator initially represents fresh water with no salt.

Figure 3:
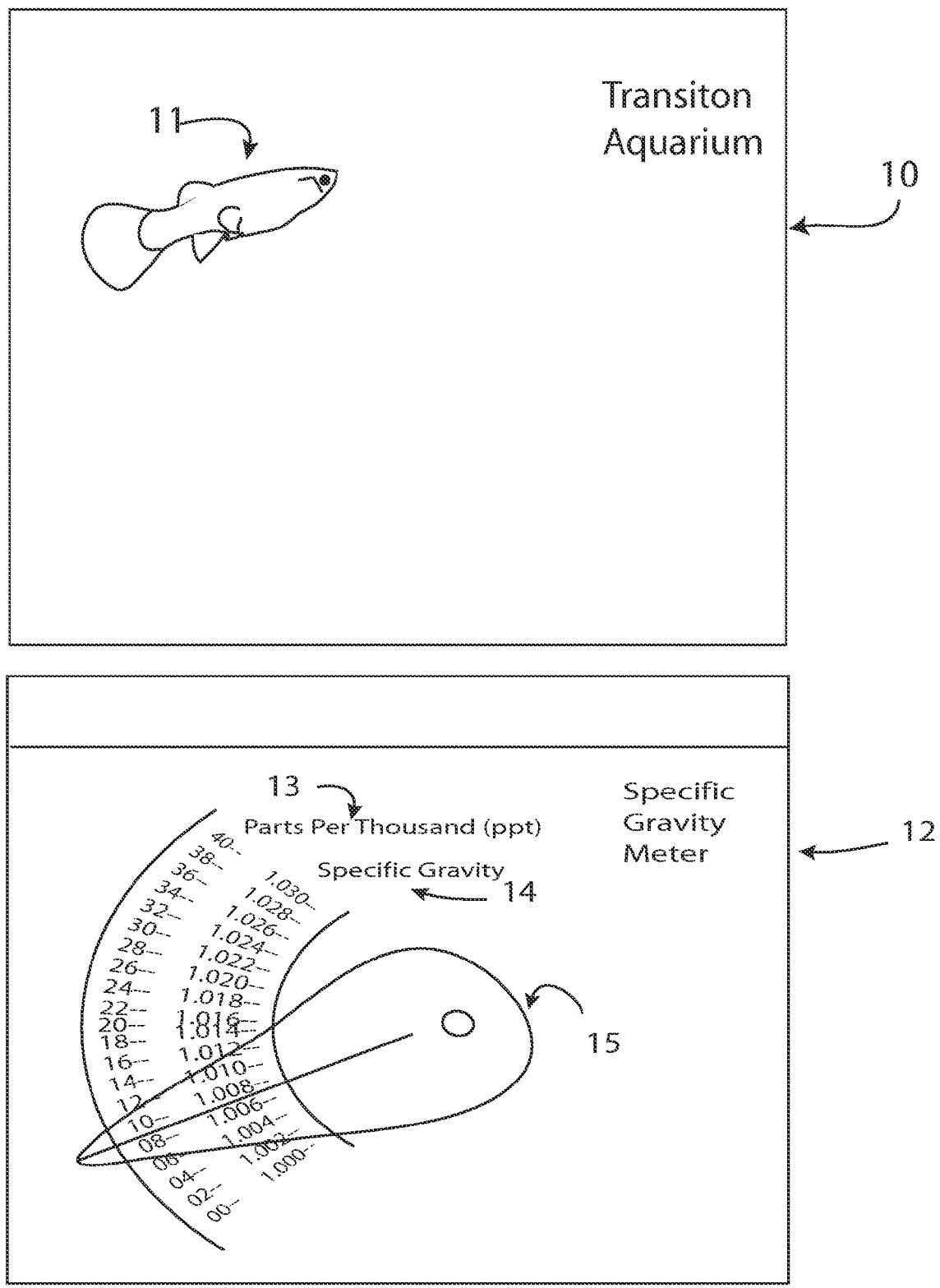
FIG. 3 depicts the next following phase of the process where a transition aquarium at the salinity of amniotic fluid is populated with pregnant females that are close to the birthing process.

FIG. 3 depicts the initial transition aquarium (label 10) and the initial specific gravity meter (label 12) for the for mentioned initial transition aquarium.

The initial transition aquarium is populated with pregnant females (label 11) that are close to the birthing process.

The specific gravity meter consists of two related scales (label 13 and label 14). The indicator (label 15) represents the salinity of the transition aquarium which matches the salinity of amniotic fluids. For this embodiment the amniotic salinity is indicated at a 1.007 specific gravity or at 9 parts per thousand.

Figure 4:
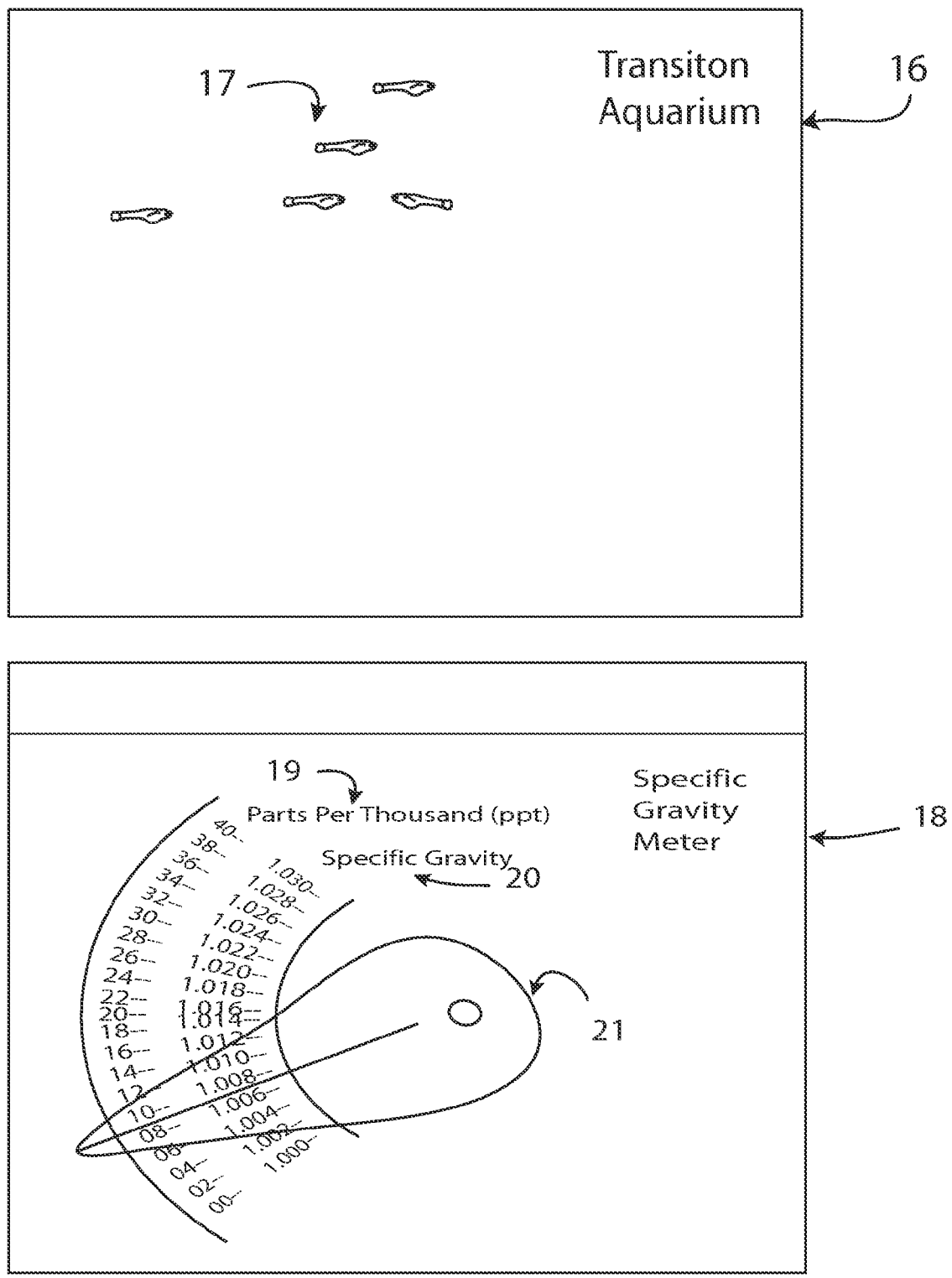
FIG. 4 depicts the next following phase of the process where the transition aquarium now contains only newly born fry.

FIG. 4 depicts the transition aquarium (label 16) and the specific gravity meter (label 18).

The transition aquarium is populated with fry (label 17) born in the transition aquarium where the mothers and any other adult fish have been removed.

The specific gravity meter consists of two related scales (label 19 and label 20). The indicator (label 21) indicates the salinity of the transition aquarium is at the same level as amniotic fluids. For this embodiment the amniotic salinity is indicated at a 1.007 specific gravity or at 9 parts per thousand.

Figure 5:
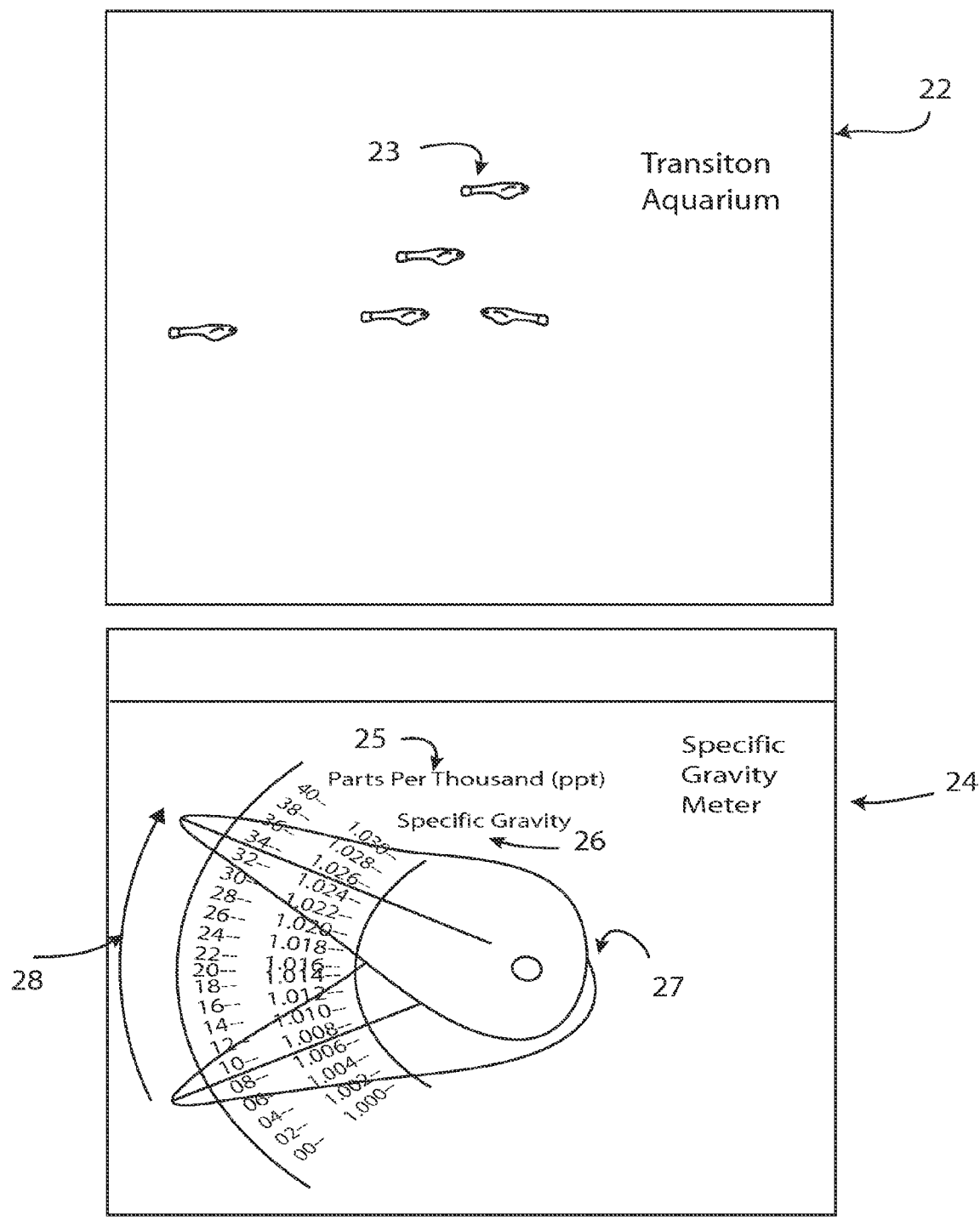
FIG. 5 depicts the next following phase of the process where the transition aquarium's salinity is increased to that of salt water. The fry mature to adults.

FIG. 5 depicts the transition aquarium (label 22) and the specific gravity meter (label 24).

The transition aquarium is populated with adolescence fish (label 23). These adolescence fish were born in the transition aquarium when the salinity matched that of amniotic fluid and are allowed to mature as the salinity is gradually increased from the amniotic fluid level to the salinity of salt water.

The specific gravity meter consists of two related scales (label 25 and label 26). The indicator (label 27) is shown in two different positions. The lower position is the setting associated with amniotic fluid. The higher position is the setting associated with sea water. The arched arrow (label 28) indicates the motion of the indicator as it moves from one setting to another setting. The transition from one level of salinity to another level of salinity takes place over several weeks and is associated with the period of adolescence development from fry to adult.

Figure 6:
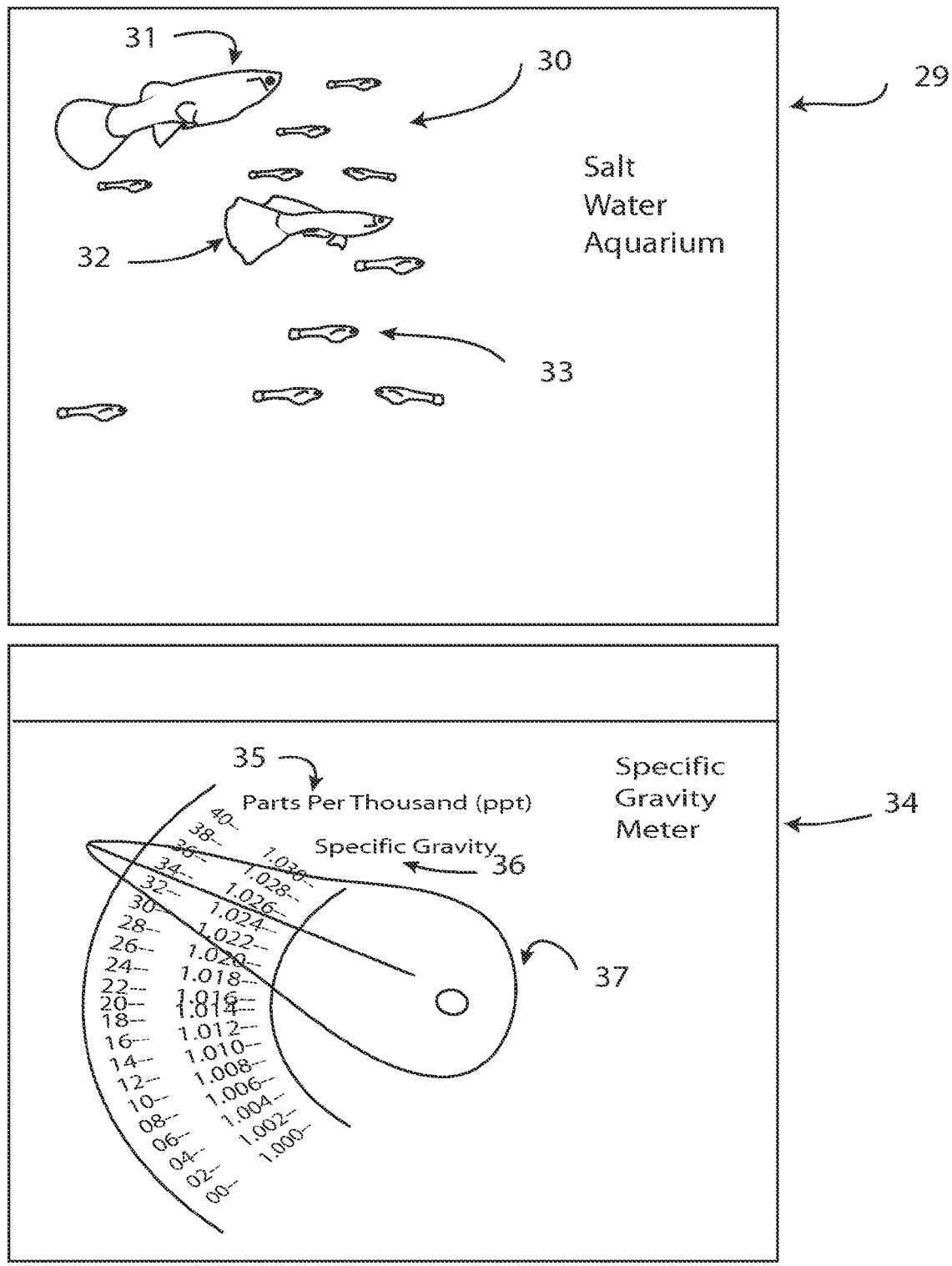
FIG. 6 depicts the final phase of the process ending with a stable population of live-bearing salt water fish in a salt water aquarium.

FIG. 6 depicts the final salt-water aquarium (label 29) and the final specific gravity meter (label 34).

The salt water aquarium is populated with adult females (label 31), adult males (label 32), fry (label 30), and adolescents (label 33). The fish population is stable and breeds true and requires no other process associated with salinity stabilization.

The specific gravity meter consists of two related scales (label 35 and label 36). The indicator (label 37) indicates the salinity of the salt-water aquarium is at the final level. For this embodiment the final salinity is indicated at a 1.025 specific gravity or at 33 parts per thousand.

DESCRIPTION OF A PREFERRED EMBODIMENT

Guppies breed and survive in fresh water. An ideal temperature range is between 72 and 76 degrees Fahrenheit. Baby guppies, fry, thrive in slightly warmer water temperatures of between 78 to 80 degrees Fahrenheit. Guppies may survive in temperatures as low as 60 degrees Fahrenheit and as high as 90 degrees Fahrenheit.

Guppies are live bearers with an average gestation period of 28 days. Live bearers do not lay eggs, like many fish, but give birth to live babies. The pregnant female guppy is basically a swimming egg sac. The fry are able to feed themselves at birth. Female guppies have drops of between 30 to 60 fry. Fry grow into adult fish in only a few months of either male or female sex. The female matures at about 3 months, the males earlier, at around 6 weeks. The life span for a well cared-for guppy is 1.5 to 3 years on average.

Breeding guppies is very easy. Once male and female are together they will quickly breed. A female fish after conception uses some of the sperm to internally fertilize a brew of fry. Some of the sperm is stored for future pregnancies in a process called superfetation. A single mating can produce 4 to 8 brews of fry. Females appear plump when pregnant and often have a black spot, a gravid spot, on their bellies.

Guppies can withstand brackish medium-hard water to some extent but if you place guppies into a salt water tank, the gills will quickly turn bright red with salt burn and the guppies will soon die within a few days. A simple fish net can be used to move fish from one aquarium to another aquarium.

Salt concentration, salinity, can be measured in a variety of methods. One of the most common methods is to use a specific gravity device. The specific gravity device has a calibrated compartment for the sample under measurement. The compartment also has a floating indicator. The specific gravity is the ratio of density of the sample to the density of pure water. By definition, pure water has a specific gravity of unity. As you add salt to the sample, the specific gravity increases. Salt water, as found in aquariums, has a specific gravity of 1.02 to 1.03.

Another measurement of salinity is grams of salt per liter of solution expressed in parts per thousand (ppt). The salinity of sea water is approximately 35 ppt while fresh water has a zero ppt. The measurement of salinity is temperature dependent. Given a constant temperature, a relationship can be formulated between salinity measured by specific gravity and parts per thousands. The salinity of sea water varies based on time of year, location, and temperature. A traditional salinity of a tropical salt water aquarium is about 33 ppt.

The specific gravity of human amniotic fluid ranges from 1.006 to 1.008. The specific gravity of body fluids of saltwater fish is about 1.007. Just about all life forms have similar salinity of their body fluids.

The salinity of the water is increased by adding a dry salt mixture. This salt mixture is typically extracted from sea water is large evaporation ponds. To decrease the salinity of the salt water, some salt water is removed and replaced with fresh water.

Fresh water fish have body fluids far saltier than their surrounding environments. Salt water fish have body fluids less salty than their surrounding environments. Body fluids of salt water fish are about three times less salty than sea water. Fish kidneys lack the capability to make urine saltier than body fluids. In particular, fish kidneys lack the loop of Henle structure.

For a fresh water fish in fresh water, the salinity of the body fluids is greater than the surrounding water. The fresh water fish does not drink water but gains copious amounts of water through the skin through an osmosis process. Water and salt loss is through urination. Salt retention is through the gills. In summary, for fresh water fish in fresh water, water is absorbed through the skin and salt is expelled through urination.

In a salt water fish in salt water, the salinity of the body fluids is less that the surrounding salt water. The salt water fish drinks salt water and loses copious amounts of water through the skin. There is little loss of water through urination. Salt is pumped out by special cells in the gills. In summary, for salt water fish in saltwater, water is absorbed through the gut, loss through the skin while salt is expelled through the gills.

Prolactin, a pituitary hormone, plays a key role in salt retention in fresh water fish. This is known because a fresh water fish that has its pituitary gland removed will die from salt loss. However, if prolactin is administered, the fresh water fish will survive.

Cortisol, a steroid hormone secreted in the adrenal cortex, is crucial to the development of salt water tolerance. Cortisol secretions correlate with an increase in salt excretion, in biological salt pumping by proteins in the gills, and in the absorption of ions and water in the gut.

Cells in the gills have biological salt pumps. These biological salt pumps can move salt into or out of the body. The salt elimination biological process uses these pumps to remove salt from the body. The salt retention biological process uses these pumps to move salt into the body. The pump activity is controlled by prolactin and influenced by cortisol. Salt water fish have the vast majority of these biological salt pumps configured for salt elimination while fresh water fish have the vast majority of these biological salt pumps configured for salt retention.

Consider a fry of a fresh water live-bearer fish before birth. The fry are living in an environment where the salinity of the fry's body fluids and the salinity of the amniotic fluid are about equal. The process of osmosis that would normally move water into the fry's body is inactive because there is no salinity gradient. The fry drink the amniotic fluid to obtain water and, in the same drink, also obtain salt. Over time, the salt levels increase in the fetal fry. The pituitary hormone prolatin is active because salt levels are not in balance. The fry gills contain biological salt pumps configures both for salt retention and elimination.

If birth occurs in fresh water, the biological salt pumps in the gills configured for salt elimination are no longer needed and are deactivated. A fresh water birth is the normal course. If the birth occurs in salt water at the salinity of sea water, the salt concentrations in the fry quickly increase much faster than the fry's biology can keep pace. The fry will soon die.

However, if the birth takes place in water that matches the salinity of the amniotic fluid, the biological salt pumps in the gills configured for salt elimination remain active. The fry survive.

Birth is a stressful event, cortisol is a stress hormone, and thus, cortisol is present in the fry at birth. Cortisol activates prolatin which in turn, activates the biological salt pumps in the gills. This sets the stage for the fry to survive in even higher salinity environments. As the environment becomes saltier, cortisol increases, which increases prolatin, which in turn activates the biological salt pumps, which enables more salt to be pumped through the biological salt pumps in the gills.

The fry, born in a salinity matching environment, are now ready to live in salt water since they now have the similar salt maintenance chemistry of traditional salt water fish. The salinity can now be gradually increased to the salinity of sea water. The fry mature into fully functional adult fish.

The ability to live in sea water breeds true. This means that once a salinity-enabled fry matures to an adult, the offspring are able to immediately survive in salt water without any salinity conditioning. The birth of fry by a pregnant female conditioned to live in salt water can occur in salt water without modification of the salt levels.

Another embodiment the live-bearing fish are mollies.

Yet another embodiment the live-bearing fish are swordtails.

Yet another embodiment the live-bearing fish are platy.

Yet another embodiment the live-bearing fish are mosquito fish.

What is claimed is:

1. A method to enable a live-bearing freshwater fish population to live and breed in a target saltwater environment, comprising: birthing freshwater fry from the said live-bearing freshwater fish population in an initial saltwater environment where the salinity of the said initial saltwater environment matches the salinity of amniotic fluid of the said live-bearing freshwater fish population, followed by a means for increasing salinity of the said initial saltwater environment to match the salinity of the said target saltwater environment; the said freshwater fry establish a live-bearing saltwater fish population.

2. The method of claim 1 where the means for increasing salinity is accomplished in incremental steps where a salinity increment is defined by dividing a total requested increase in salinity by the number of days for said freshwater fry to reach maturity; the said total requested increase in salinity is calculated by taking the salinity of the said target saltwater environment minus the salinity of the said initial saltwater environment.

3. The method of claim 1 where the said live-bearing freshwater fish population is selected from the group consisting of family Poeciliidae and genera Poecilia commonly called guppies (Poecilia reticulate), family Poeciliidae and genera Poecilia commonly called mollies (Poecilia sphenops) and family Poeciliidae and genera Xiphophorus commonly called swordtails (Xiphophorus hellerii).

4. The said live-bearing saltwater fish population established by the method in claim 3.

5. A method to enable live-bearing freshwater fish population to live and breed in a saltwater environment, comprising: a freshwater aquarium with said live-bearing freshwater fish population comprising of fry, adolescences, adult males, and adult females where several of the live-bearing freshwater females are pregnant and near birth; a transition aquarium, initially free of fish, with salinity of the transition aquarium is set to match the salinity of amniotic fluid of the said live-bearing freshwater fish population; a saltwater aquarium initially free of fish; a means to measure salinity of the water in the aquariums; a means to change the salinity of the water in the aquariums; a means to move fish from one aquarium to another aquarium;

(i) one or more said pregnant females that are near birth are removed from the said freshwater aquarium and placed in the said transition aquarium;

(ii) one or more of the said pregnant females now in the said transition aquarium give birth to one or more transition fry; followed by the removal of now postnatal said females from the said transition aquarium;

(iii) followed by incrementally increasing the salinity of the said transition aquarium to that of sea water over a period defined by the time necessary for the said fry to mature into adolescence; the said transition fry mature into adolescence transition fish;

(iv) the said adolescence transition fish in the said transition aquarium now at salinity of sea water mature into transition adult live-bearing fish;

(v) the said transition adult live-bearing fish are removed from the said transition aquarium and placed in the said saltwater aquarium: the said transition adult live-bearing fish establish a stable live-bearing saltwater fish population that breed true to saltwater.

* * * * *